(12) United States Patent
McCoige

(10) Patent No.: US 8,925,640 B2
(45) Date of Patent: Jan. 6, 2015

(54) INTEGRAL TANK IN FRAME

(75) Inventor: Chad A. McCoige, Charlotte, MI (US)

(73) Assignee: Spartan Motors, Inc., Charlotte, MI (US)

( * ) Notice: Subject to any disclaimer, the term of this patent is extended or adjusted under 35 U.S.C. 154(b) by 850 days.

(21) Appl. No.: 13/172,365

(22) Filed: Jun. 29, 2011

(65) Prior Publication Data

US 2012/0000678 A1 Jan. 5, 2012

Related U.S. Application Data

(60) Provisional application No. 61/360,657, filed on Jul. 1, 2010.

(51) Int. Cl.
*A62C 27/00* (2006.01)

(52) U.S. Cl.
CPC ..................... *A62C 27/00* (2013.01)
USPC ................. 169/24; 169/13; 169/52; 239/172; 296/37.6; 280/838

(58) Field of Classification Search
CPC .......... A62C 5/02; A62C 35/00; A62C 35/02; A62C 27/00; A62C 25/005; A01M 7/0082; A01G 25/09; B60P 3/22; B60P 3/2215; B60P 3/2225; B60R 9/00; B62K 19/46
USPC ................ 169/13, 24, 52; 239/172; 296/37.1, 296/37.6; 280/838
See application file for complete search history.

(56) References Cited

U.S. PATENT DOCUMENTS

| | | | | |
|---|---|---|---|---|
| 4,830,421 | A * | 5/1989 | Hawelka et al. | 239/172 |
| 6,915,860 | B2 | 7/2005 | Feller | |
| 7,234,534 | B2 * | 6/2007 | Froland et al. | 169/24 |
| 7,631,700 | B1 * | 12/2009 | Gil | 169/13 |
| 2005/0056435 | A1 * | 3/2005 | Price et al. | 169/52 |
| 2011/0259614 | A1 * | 10/2011 | Ver Steeg et al. | 169/24 |

\* cited by examiner

*Primary Examiner* — Steven J Ganey
(74) *Attorney, Agent, or Firm* — Reinhart Boerner Van Deuren P.C.

(57) ABSTRACT

An integral tank frame for an emergency response vehicle is provided. The integral tank frame includes a tank mounted within an envelope of space of a ladder frame. The ladder frame has side rails that support the tank on either side thereof. The tank can be mounted to the side rails such that it extends across the top of the side rails, interior to the side rails, or a combination thereof.

16 Claims, 9 Drawing Sheets

INTEGRAL TANK IN FRAME

CROSS-REFERENCE TO RELATED PATENT APPLICATION

This patent application claims the benefit of U.S. Provisional Patent Application No. 61/360,657, filed Jul. 1, 2010, the entire teachings and disclosure of which are incorporated herein by reference thereto.

FIELD OF THE INVENTION

This invention generally relates to emergency response vehicles, and more particularly to emergency response vehicles incorporating a fluid tank for use in fighting fires and other rescue operations.

BACKGROUND OF THE INVENTION

Many traditional emergency response vehicles, e.g. pumper and aerial firefighting trucks, draw water or other fluids from an external source to deliver the same via hoses and/or cannons onto a fire. This external source is often times a city's water supply, connected to the firefighting vehicle via a fire hydrant. In rural areas, this external source is often times supplied by a tanker truck, that travels with other firefighting vehicles to the location of a fire. The firefighting vehicles connect to the tanker, and thereafter, direct water or other fluid carried by the tanker onto the fire.

In recent years, the design of many contemporary emergency response vehicles has shifted to incorporate a tank in the body of the vehicle that provides a stand alone source of water or other fluids commonly used in firefighting operations. With this design, many fires in urban areas can be dealt with without the need to connect to the city's water supply. Obviating this need results in faster response times. Similarly, the need to send a tanker truck to rural areas to fight fires is also reduced, as the emergency response vehicle used to fight the fire carries its own water or other fluid. Sending a single vehicle as opposed to multiple vehicles can reduce the cost associated with fighting fires in rural areas.

Unfortunately, several problems arise when incorporating a stand alone tank into an emergency response vehicle. As one example, the tank is typically mounted to the body of the vehicle. In this configuration, the tank requires additional support structure to support the weight of the tank. Additionally, the support structure and the tank itself reduce the amount of space on the body of the vehicle ordinarily used to store equipment such as ladders, axes, and the like.

As another example, the tank is often times mounted proximate to, or at, the top of the body of the vehicle. As a result, the overall center of gravity of the vehicle is high, and there is an increased risk of rollover on certain terrains. This increased center of gravity also affects the stability, ride, and handling of the vehicle.

In view of the above, there is a need in the art for a stand alone tank in an emergency response vehicle that alleviates the above problems. The invention provides such a tank. These and other advantages of the invention, as well as additional inventive features, will be apparent from the description of the invention provided herein.

BRIEF SUMMARY OF THE INVENTION

In one aspect, embodiments of the invention provide a frame for an emergency vehicle. An embodiment of the frame includes a pair of longitudinally extending side rails. A plurality of lateral supports extend transversely between the pair of longitudinally extending side rails to form a ladder shaped configuration. An envelope of space is defined between the pair of longitudinally extending side rails and between an adjacent pair of the plurality of lateral supports. A tank is mounted within the envelope space. The tank is configured to carry a flame retardant fluid.

In certain embodiments, the tank is mounted directly to the pair of longitudinally extending side rails. In certain other embodiments, the tank includes integral side rail portions. The integral side rail portions are positioned on opposing sides of the tank and configured for mechanical attachment to the pair of longitudinally extending side rails. In certain embodiments, the integral side rail portions form load bearing members of the frame.

In certain embodiments, the tank includes integral side rail portions. The integral side rail portions extend through the tank such that the tank surrounds the integral side rail portions. The integral side rail portions are configured for mechanical attachment to the pair of longitudinally extending side rails. In certain embodiments, the integral side rail portions form load bearing members of the frame.

In certain embodiments, a flame retardant fluid is carried within the tank. In certain embodiments, the flame retardant fluid is water. In certain other embodiments, the flame retardant fluid is a foam. In certain other embodiments, the tank has a fluid capacity of about 100 gallons to about 2,000 gallons.

In another aspect of the invention, a frame for an emergency vehicle is provided. An embodiment of a frame according to this aspect includes a pair of longitudinally extending side rails. The frame also includes a plurality of lateral supports extending transversely between the pair of longitudinally extending side rails to form a ladder shaped configuration. A tank configured to carry a flame retardant fluid is mounted directly to and extends between the pair of longitudinally extending side rails. The tank includes a port for fluid communication with an interior of the tank. The frame also includes a pumping system mounted to the pair of longitudinally extending side rails and connected to the port of the tank for pumping flame retardant fluid into and out of the tank.

In certain embodiments, the pumping system includes a motor in fluid communication with the port of the tank for providing a pumping force to pump the flame retardant fluid into and out of the tank. The motor is interposed between the pair of longitudinally extending side rails. The pumping system also includes a pump housing in fluid communication with the motor and with the port of the tank. The pump housing is configured to divert fluid pumped from the tank to a conduit connected to the pump housing. The pump housing is also configured to divert fluid into the tank.

In certain embodiments, the tank has a T-shaped cross section. A first portion of the T-shaped cross section has a first width less than a second width of a second portion of the T-shaped cross section. In certain embodiments, the second portion is mounted on top of a top surface of the pair of longitudinally extending side rails. In certain embodiments, each one of the pair of longitudinally extending side rails has a C-shaped profile that defines an interior channel. The second portion of the tank extends into the interior channel of each of the longitudinally extending side rails.

In certain embodiments, each of the pair of longitudinally extending side rails includes a top surface. The top surface of one of the pair of longitudinally extending side rails is coplanar with the top surface of the other one of the pair of longitudinally extending side rails. Each of the pair of longitudinally extending side rails also includes a bottom surface. The bottom surface of one of the pair of longitudinally extending side rails is coplanar with the bottom surface of the other one of the pair of longitudinally extending side rails. The tank is mounted to the pair of longitudinally extending side rails such that it does not extend above the top surfaces of the pair of longitudinally extending side rails, and such that it does not extend below the bottom surfaces of the pair of longitudinally extending side rails.

In another aspect, a method of mounting a tank configured for carrying a flame retardant fluid to a ladder shaped frame is provided. An embodiment of the method includes mounting the tank such that it is disposed within an envelope space defined between the pair of longitudinally extending side rails. In certain embodiments, the step of mounting includes mounting the tank directly to the pair of longitudinally extending side rails.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
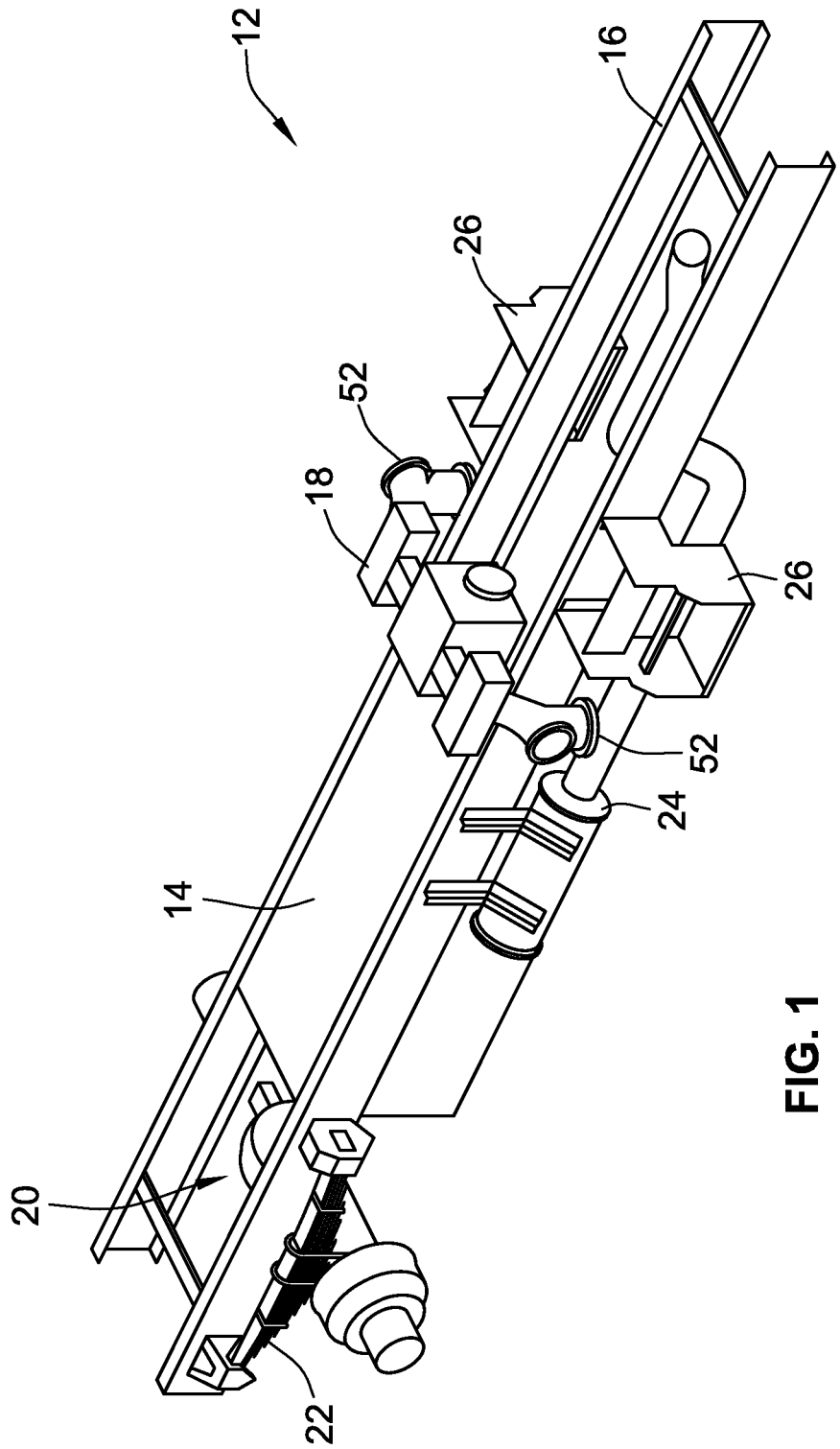
FIG. 1 is a perspective view of an integral tank frame according to the teachings of the present invention.

Turning now to the drawings, there is illustrated in FIG. 1 an integral tank frame 12. The integral tank frame 12 includes a tank 14 for containing a flame retardant fluid, e.g. water, or a liquid or foam chemical solution, mounted to a ladder frame 16. The tank 14 and ladder frame 16 can be provided in a variety of dimensions to accommodate different types of emergency response vehicles. As such, it will be recognized that the invention is not limited to any particular class of emergency response vehicles. Rather, the integral tank frame 12 can be scaled up or down to accommodate a variety of emergency response vehicles used in a variety of applications.

With reference to FIG. 1, as will be discussed in greater detail below, the tank 14 can mount to the ladder frame 16 in a variety of configurations. As one example, and unlike prior designs discussed above, the tank 14 mounts directly to the ladder frame 16. As another example, portions of the tank 14 provide integral support members (see e.g. FIG. 9) that are later welded with a remainder of a ladder frame such that these portions form a part of the ladder frame a vehicle incorporating the same. As a result, the integral tank frame 12 is "integral" with the remainder of the ladder frame 16 as it forms a portion thereof.

Because the tank 14 mounts directly to the ladder frame 16, or is integral therewith, the equipment storage space that would otherwise be sacrificed by mounting a tank to the body of an emergency response vehicle is left undisturbed. As another advantage, mounting the tank 14 directly to, or forming the same integrally with, the ladder frame 16 results in an overall lower center of gravity for the emergency response vehicle incorporating the integral tank frame 12. As such, the vehicle generally has enhanced stability, ride, and handling.

As used herein, "mounting directly" means that the tank 14 mounts to the ladder frame 16 in such a way that other body portions of an emergency response vehicle utilizing the integral tank frame 12 are generally not interposed between the ladder frame 16 and the tank 14. Put another way, the ladder frame 16 functions as the primary load bearing member for the tank 14, and no intermediary structures are interposed between the tank and the ladder frame 16. As used herein, "integral", and "formed integrally with" means that the tank 14 includes rail portions thereof that form part of the primary load bearing rails or members of a ladder style chassis or frame such that the remainder of the frame is formed by welding or otherwise attaching sections of the primary load bearing rails to the rail portions of the tank 14. Further, whether mounted directly or formed integrally with the frame 16, the tank 14 also acts as a part of the load bearing structure of the frame as it will transfer frame loads by way of its extension between and connection to the side rails of the frame 16. As such, the tank 14 acts as a lateral support member (see FIG. 5) of the frame 16, and thus reduces the number of lateral supports otherwise required by a conventional ladder frame design.

The tank 14 is mounted to the ladder frame 16 in such a way that the mounting and locations of the drive train 20, suspension 22, exhaust system 24, and other mounting structures such as battery holders 26 remain undisturbed by the inclusion of the tank 14. Further, and as will be discussed below, the ladder frame 16 also supports a pumping system 18 used to empty and/or fill the tank 14 during operation.

Figure 2:
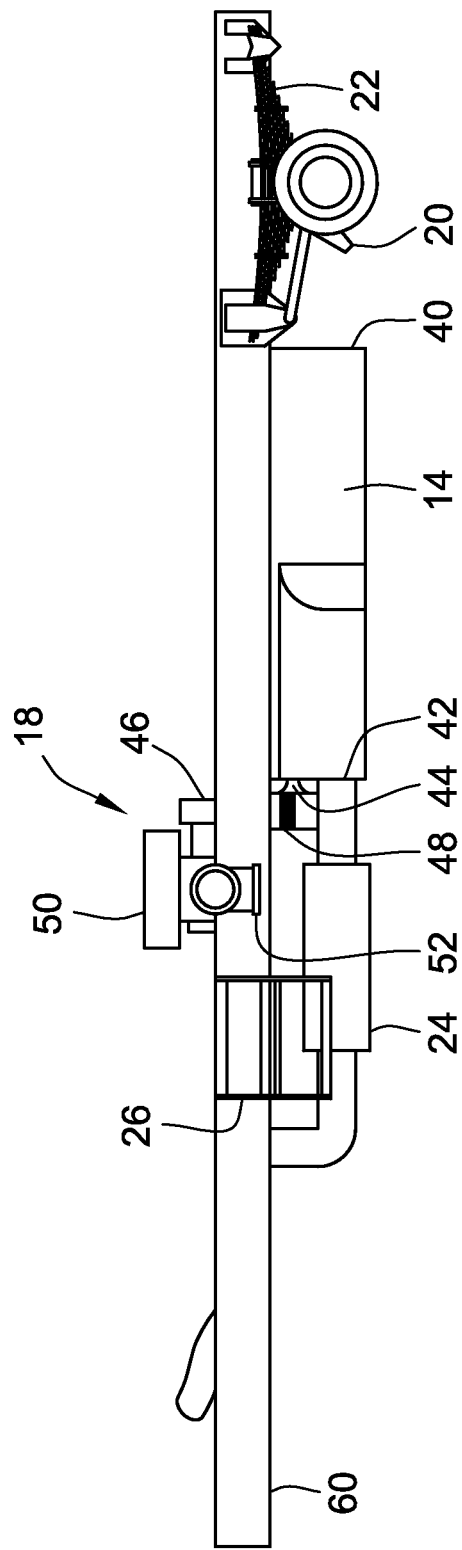
FIG. 2 is a side view of the integral tank frame of FIG. 1.

Turning now to FIG. 2, a side view of the tank 14 in relation to the ladder frame 16 is illustrated. Although illustrated as generally box shaped, the tank 14 can have a variety of shapes in other embodiments as described below. For example, the tank 14 can have a cylindrical shape, elliptical shape, or other non-rectangular shapes. The tank 14 generally has a first end 40 and a second end 42. The first end 40 is proximate to the drive train 20, while the second end 42 is generally behind the first end 40 relative to the drive train 20. The second end 42 includes a port 44 for connection to the pumping system 18. The port 44 facilitates fluid communication between the pumping system 18 and the interior of the tank 14. The tank 14 can also include an additional port or ports for the connection of additional tanks to the tank 14 to increase the overall effective volume of the tank.

The tank 14 is generally ahead of the drive train 20 relative to the front end of the emergency response vehicle incorporating the integral tank frame 12. However, in other embodiments, the tank 14 can be located at other locations relative to the ladder frame 16, such as behind the drive train 20. The tank 14 is positioned such that the drive shaft (not shown) of the drive train can freely mechanically communicate with the transmission thereof. Put differently, the location of the tank 14 does not effect the interconnection of the drive train of the emergency vehicle. In one embodiment, the tank 14 can be manufactured with a metal tube or sleeve extending therethrough to allow the drive shaft to pass through the tank 14 without the need to sealingly engage the drive shaft. It will be recognized that such an embodiment permits the tank 14 to have a larger volume.

As discussed above, the tank 14 and ladder frame 16 can be scaled up or down to accommodate different applications. As a result, typically the tank 14 can have a capacity ranging from about 100 gallons to about 2000 gallons, but embodiments of the invention are not so limited. Indeed, other tank 14 sizes are contemplated depending on the particular application. Generally, the size of the tank 14 will depend upon several factors, including but not limited to, the dimensions of the ladder frame 16 required for a particular vehicle, and what type of fluid will be carried by the tank 14.

The pumping system 18 generally includes a motor 48 for drawing fluid out of or into the tank 14. The motor 48 is connected to an inlet 46 of a pump housing 50 of the pumping system 18 that has a plurality of ports 52. The ports 52 allow for the connection of hoses used for the removal or input of fluid into the tank 14.

The pumping system 18 also allows for the interconnection of multiple fluid sources. For example, the pumping system 18 is in direct fluid communication with the tank 14 via the port 44. An additional external source can be connected to the pumping system 18 via one of the plurality of ports 52. A hose can be connected to another one of the plurality of ports. In this configuration, water or other fluid is supplied from the tank 14 mounted to the ladder frame 16 as well as the source. The external source can be an additional tank carried by the emergency response vehicle incorporating the integral tank frame 12, another vehicle, or can be a city's water supply.

Figure 3:
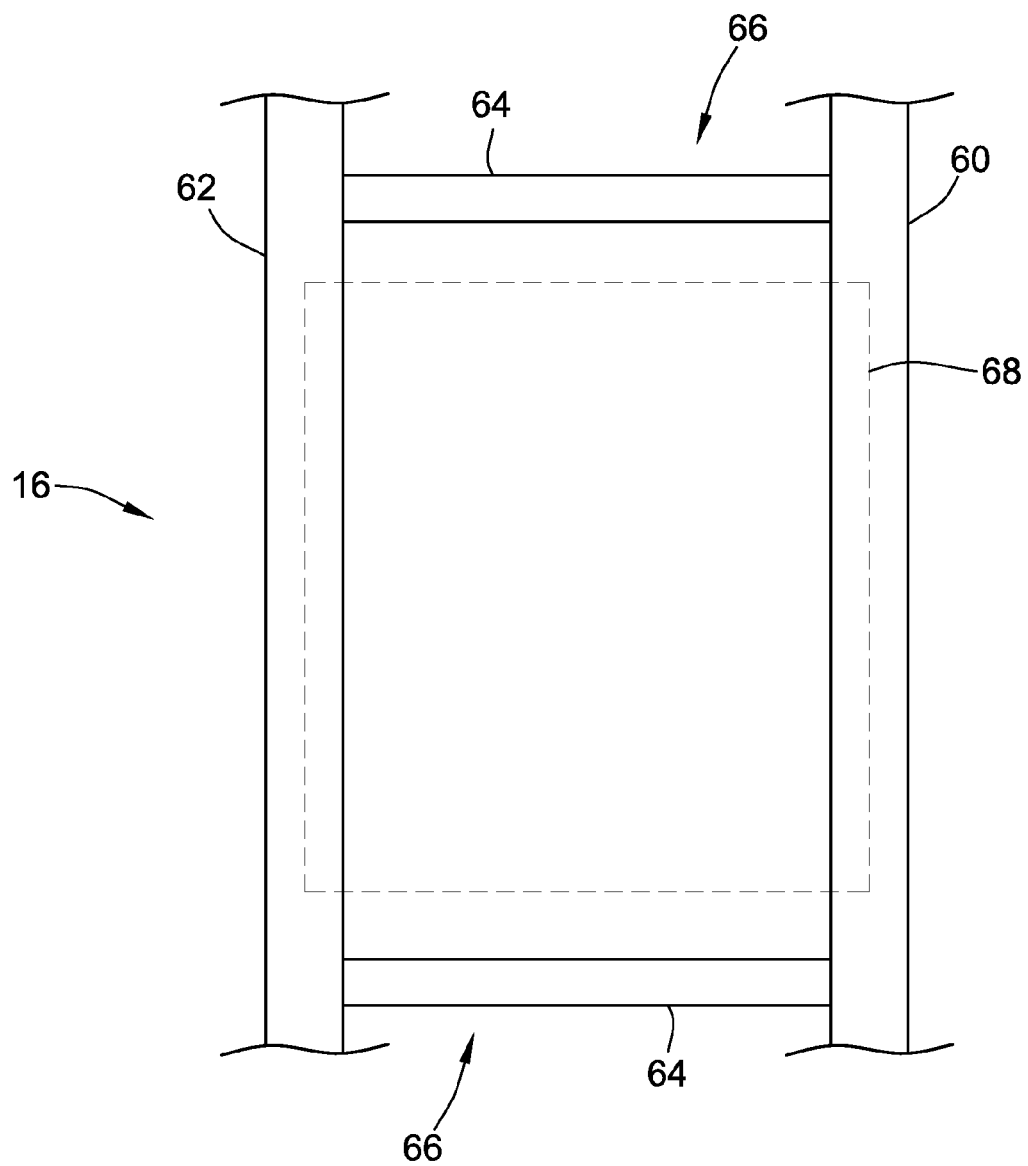
FIG. 3 is a top view of a portion of a ladder frame of the integral tank frame of FIG. 1.

Turning now to FIG. 3, the ladder frame has a pair of C-shaped side rails 60, 62 that are mirror images of one another. The side rails 60, 62 are spaced apart and a plurality of lateral supports 64 are positioned between the side rails 60, 62. There is generally an open area of space 66 between the side rails 60, 62. The lateral supports 64 are intermittently placed within the open space 66. A three dimensional interior/envelope of space 68 is defined between adjacent lateral supports 64. The tank 14 (see FIG. 2) is generally disposed within the envelope of space 68 (see also FIG. 4). Although illustrated as situated between two lateral supports 64, it is recognized that the envelope of space 68 for receipt of the tank 14 can be located at other locations along the side rails 60, 62. For example, the envelope of space 68 may be positioned beyond the trailing most lateral support 64 or the leading most lateral support 64 (i.e. proximate to the front or rear of the ladder frame 16).

Figure 4:
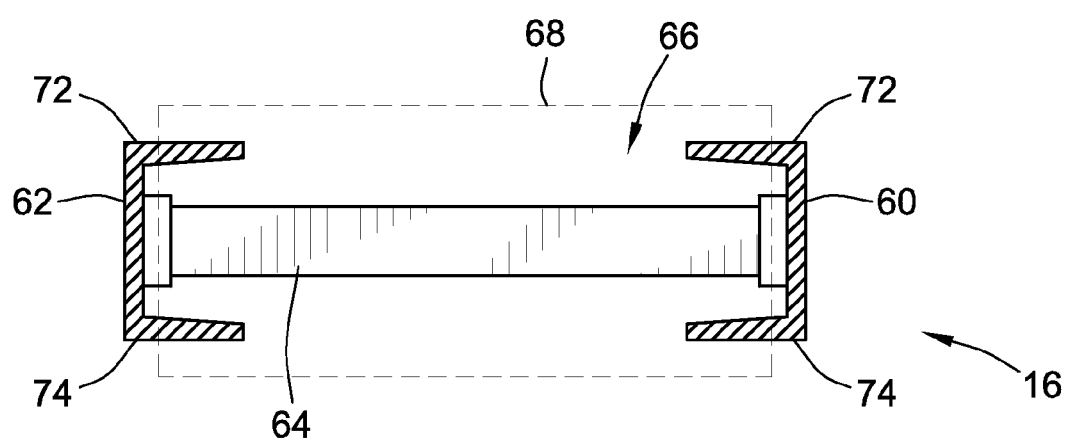
FIG. 4 is a front cross sectional view of the ladder frame of FIG. 3.

With reference to FIG. 4, a front view of the envelope of space 68 is illustrated. Generally, the tank 14 (see FIG. 2) resides within the envelope of space 68 between the side rails 60, 62. As illustrated, the envelope of space 68 may extend above and below top and bottom surfaces 72, 74, respectively, of the side rails 60, 62. Generally, the tank 14 may be located in the envelope of space 68 such that it is above the top surfaces 72 of the side rails 60, 62, below the bottom surfaces 74 of the side rails 60, 62, in the space 66 between the side rails 60, 62, or any combination thereof.

Figure 5:
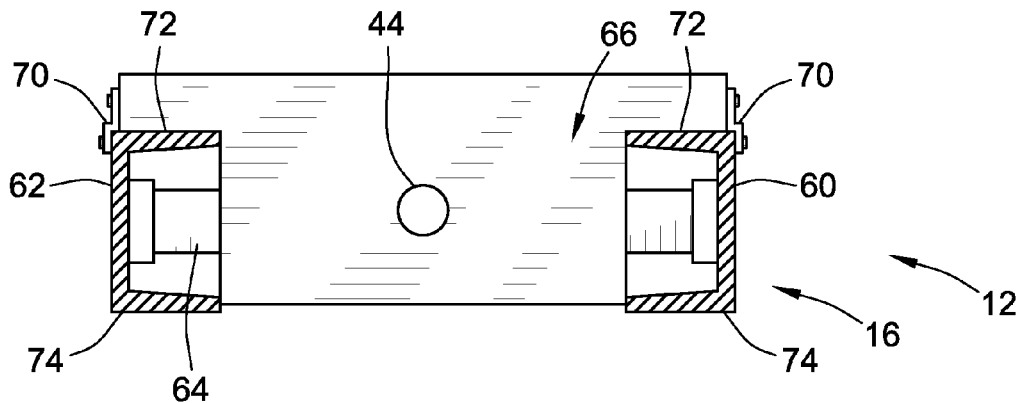
FIGS. 5-8 is are front cross sectional views of various embodiments of mounting configurations of the tank relative to the ladder frame of the integral tank frame of FIG. 1.

Turning now to FIG. 5, a front view of the tank 14 mounted to the side rails 60, 62 of the ladder frame 16 (see FIG. 2) is illustrated. In the illustrated embodiment, the tank 14 generally has a T-shaped cross sectional profile and is situated in the envelope of space 68. As such, portions of the tank 14 rest on the top surfaces 72 of the side rails 60, 62 while another portion of the tank 14 is generally disposed within the space 66 (see FIG. 3) between the side rails 60, 62.

A plurality of mounting brackets 70 fixedly mount the tank 14 to the side rails 60, 62. The bracket 70 can be mechanically connected to the tank 14 and side rails 60, 62 in a variety of ways including but not limited to welding, brazing, fastening, etc. Additionally, although illustrated as having a generally C-shaped cross sectional profile, the side rails 60, 62 can have a variety of alternative profiles, e.g. tubular or I-shaped members.

Figure 6:
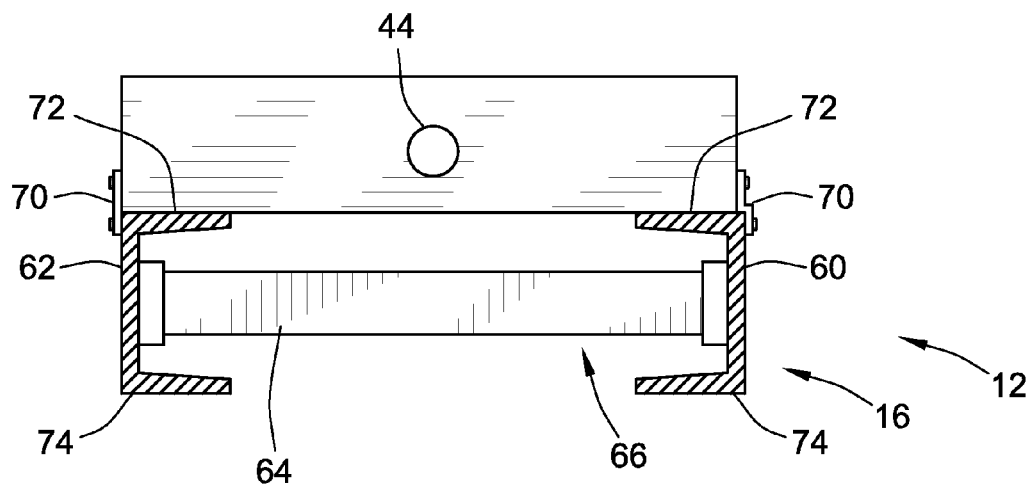

Turning now to FIG. 6, an alternative mounting configuration of the tank 14 relative to the side rails 60, 62 is illustrated. In this configuration, the tank 14 is situated entirely on the top surface 72 of the side rails 60, 62 within the envelope of space 68, but does not extend into the space 66 between the side rails 60, 62. In this configuration, the tank 14 mounts to the side rails 60, 62 using mounting bracket 70 as discussed above.

Figure 7:
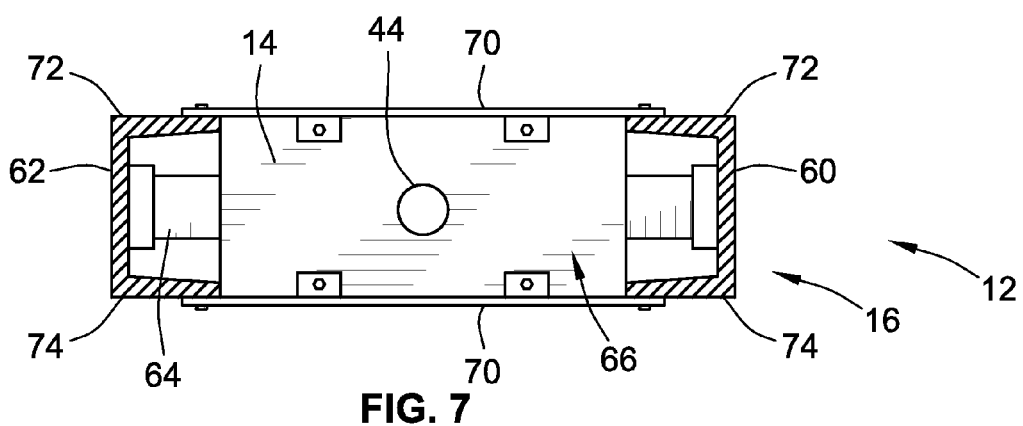

With reference now to FIG. 7 yet another alternative mounting configuration of the tank 14 relative to the side rails 60, 62 is illustrated. In this configuration, the tank 14 is entirely disposed within the space 66 between the side rails 60, 62 and within the envelope of space 68. The mounting bracket 70 extends between the side rails 60, 62 above and below the tank 14. The mounting bracket 70 mounts to the side rails 60, 62 and to the tank 14 via similar methods as discussed above. The tank 14 does not extend above or below the top and bottom surfaces 72, 74, respectively, of the side rails 60, 62.

Figure 8:
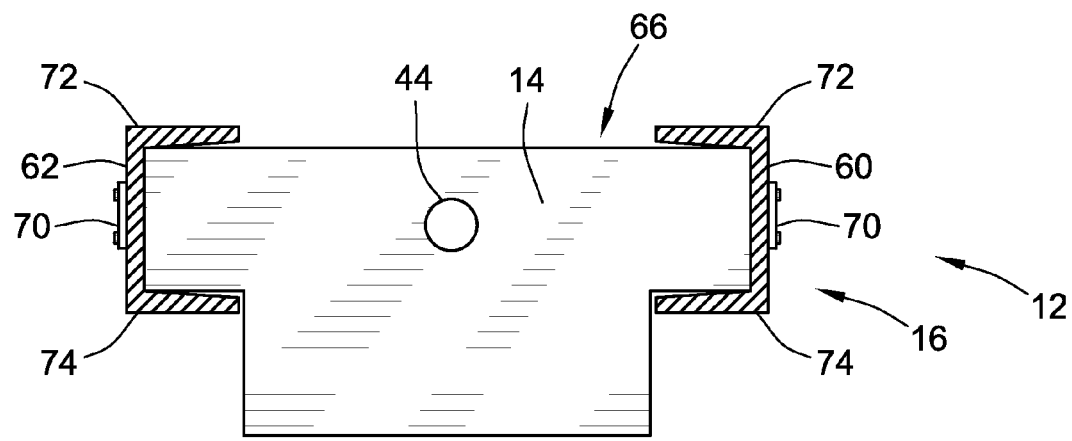

With reference to FIG. 8, yet another alternative mounting configuration of the tank 14 relative to the ladder frame 16 is illustrated. In this configuration, a portion of the tank 14 is disposed in the space 66 between the side rails 60, 62, and more particularly into interior grooves of the C-shaped side rails 60, 62. However, the tank 14 does not extend above the top surfaces 72 thereof. Another portion of the tank 14 extends below the bottom surfaces 74 of the side rails 60, 62 within the envelope of space 68. As discussed above, mounting brackets 70 are used to fixedly attach the tank 14 to the ladder frame 16.

Figure 9:
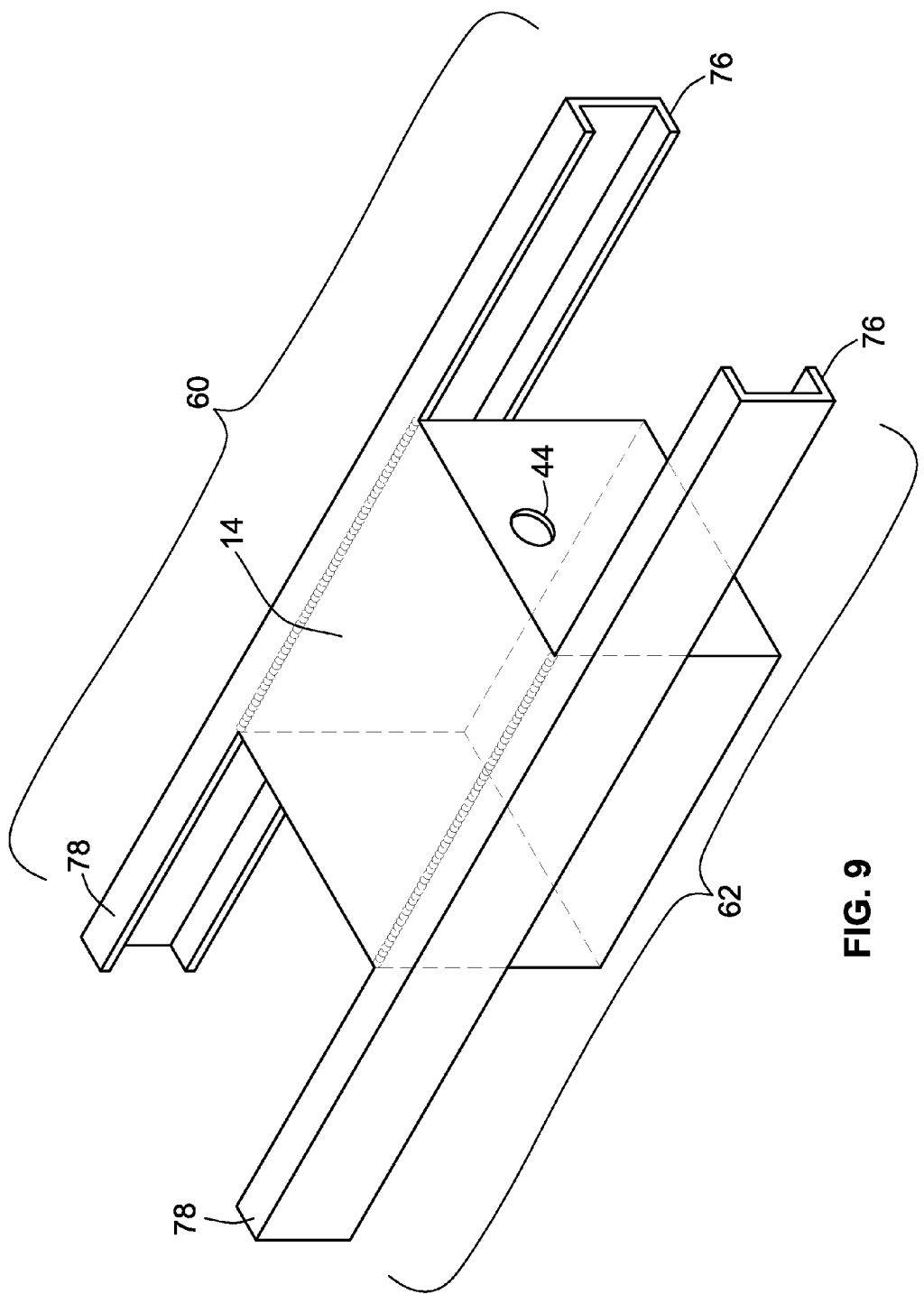
FIG. 9 is an alternative embodiment of the tank of FIG. 1.

Turning now to FIG. 9, an alternative embodiment of the integral tank frame 12 is illustrated. In this embodiment, the tank 14 includes side rails portions illustrated by sections of the side rails 60, 62 formed therein. The sections of the side rails 60, 62 have first and second ends 76, 78. Each of the first and second ends 76, 78 can be mechanically joined with the remainder of the ladder frame 16 (see FIG. 2) via welding, brazing, fasteners, etc. As a result, the tank 14 provides a portion of the load bearing structure of the ladder frame 16 (see FIG. 2), and more particularly the side rails 60, 62.

Figure 10:
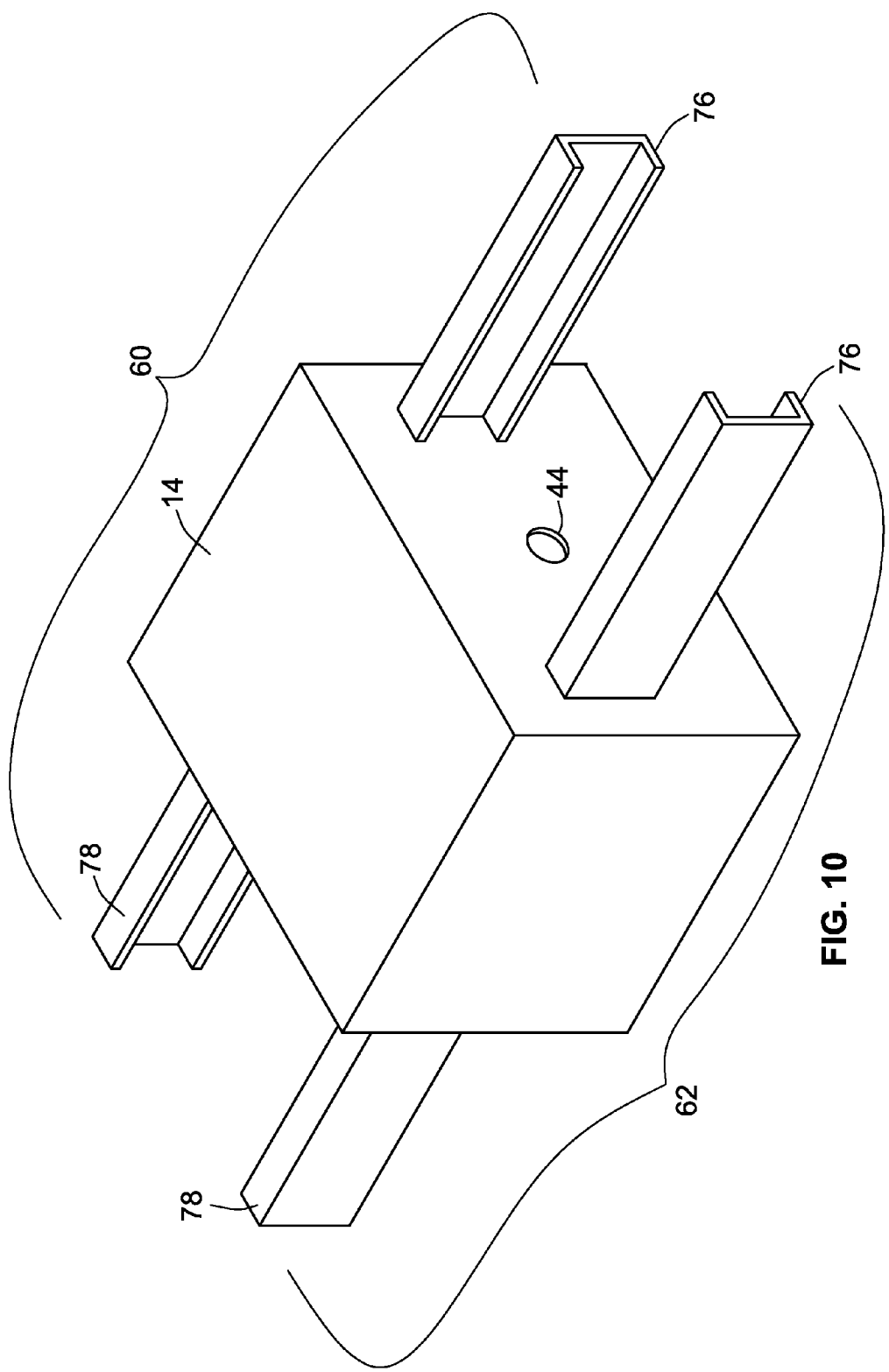
FIG. 10 is an alternative embodiment of the tank of FIG. 1.

Turning now to FIG. 10, another alternative embodiment of the integral tank frame 12 is illustrated. In this embodiment, side rail portions of the tank 14 illustrated by the side rails 60, 62 extend through the body of the tank 14. Put differently, the tank 14 is molded around and sealed with the side rails 60, 62. Such a configuration increases the available volume of the tank 14, and also allows the tank 14 to function as a load bearing member.

Figure 11:
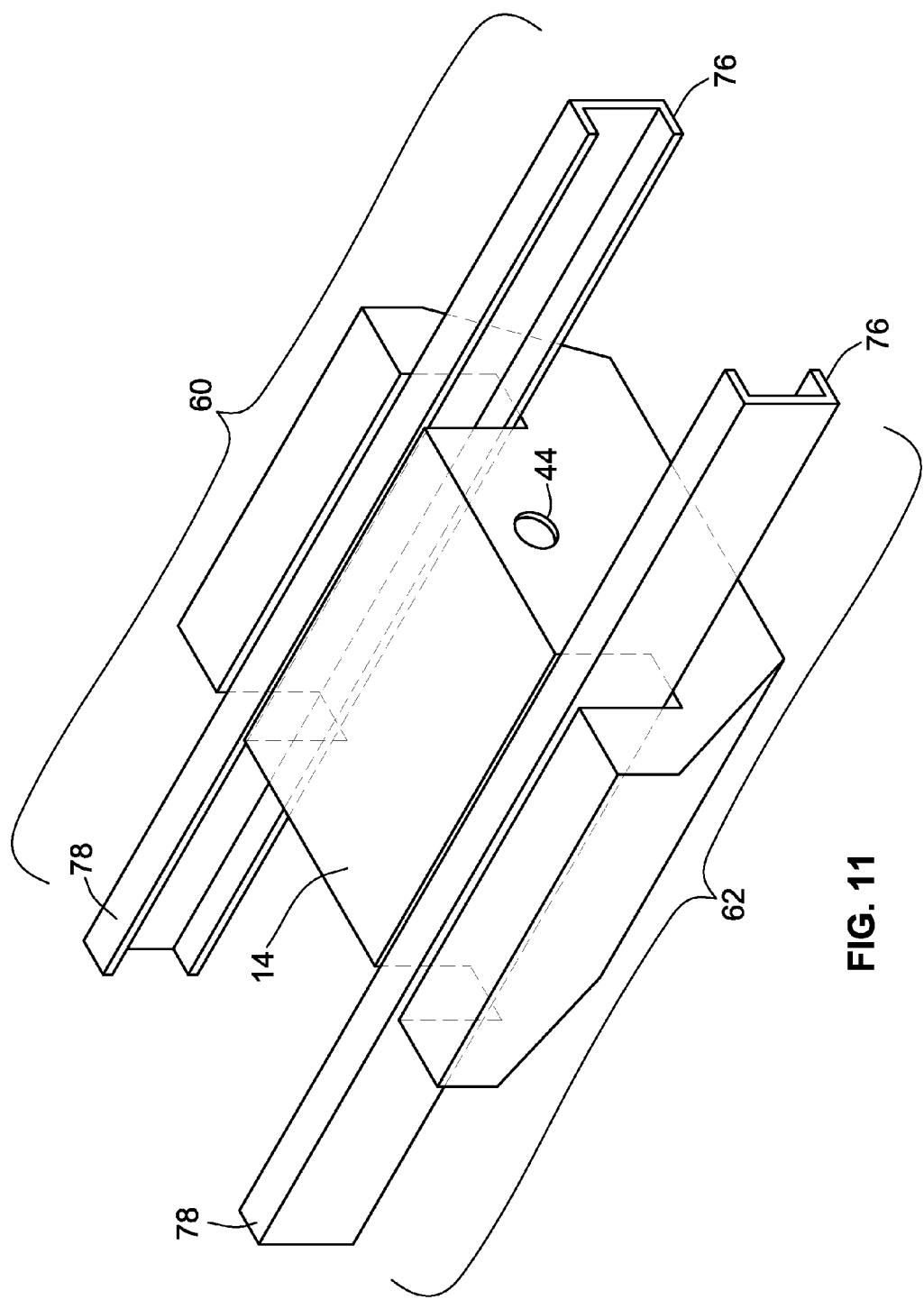
FIG. 11 is an alternative embodiment of the tank of FIG. 1.

Turning now to FIG. 11, another alternative embodiment of the integral tank frame 12 is illustrated. In this embodiment, the side rail portions 60, 62 reside within channels formed in the tank 14. As a result, that tank 14 is disposed on an interior side and an exterior side of each of the side rail portions 60, 62. Such a configuration provides for an increased volume tank, similar to the embodiment of FIG. 10. The side rail portions 60, 62 may be mounted to the tank 14 within the aforementioned channels, or in addition or in the alternative, a mounting bar or bars may be provided that extend over and are fastened to a top of the tank and the side rail portions 60, 62.

Methods of assembling the integral tank frame 12 include mounting the tank 14 to a ladder frame 16. This can include mounting the tank 14 on a top surface 72 of the side rails such that the remainder of the tank 14 extends into the space 66 between the side rails 60, 62 (see FIG. 5). In another embodiment, the tank 14 is mounted entirely on top of the top surface 72 of the side rails 60, 62 (see FIG. 6). In another embodiment, the tank 14 is mounted entirely between the side rails 60, 62 such that it does not extend above or below the top and bottom surfaces 72, 74 thereof (see FIG. 7). In another embodiment, the tank 14 is mounted to the side rails 60, 62 such that a portion thereof extends into an interior groove of the C-shaped side rails 60, 62, and a remainder of the tank 14 extends below the bottom surface 74 thereof (see FIG. 8).

Methods of assembling the integral tank frame 12 can also include providing a tank with side rail portions as illustrated at FIGS. 9-10. Such methods also include attaching the remainder of a ladder frame 16 to the side rail portions of the tank 14 such that the tank 14 and side rail portions provide a section of the load bearing structure of the ladder frame 16.

As described herein, embodiments of the invention provide for a tank 14 to be incorporated into a ladder frame 16. As a result, the additional support structures required to mount the tank 14 to an emergency response vehicle incorporating the integral tank frame 12 is minimized. As a further result, equipment and storage space is preserved. Moreover, a vehicle incorporating the integral tank frame 12 will have a lower center of gravity relative to emergency response vehicles including a tank above the ladder frame and carried by the body of the vehicle.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A frame for an emergency vehicle, comprising:
  a pair of longitudinally extending side rails;
  a plurality of lateral supports extending transversely between the pair of longitudinally extending side rails to form a ladder shaped configuration, wherein an envelope of space is defined between the of longitudinally extending side rails and between an adjacent pair of the plurality of lateral supports;
  a tank mounted within the envelope of space, the tank configured to carry a flame retardant fluid; and
  wherein the tank includes integral side rail portions, the integral side rail portions positioned on opposing sides of the tank and configured for mechanical attachment to the pair of longitudinally extending side rails.

2. The frame of claim 1, wherein the tank is mounted directly to the pair of longitudinally extending side rails, and forms a load bearing portion of the frame.

3. The frame of claim 1, wherein the integral side rail portions form load bearing members of the frame.

4. The frame of claim 1, further comprising a flame retardant fluid carried within the tank.

5. The frame of claim 4, wherein the flame retardant fluid is one of water or foam.

6. The frame of claim 1, wherein the tank includes a port configured for connection with a secondary tank.

7. The frame of claim 1, wherein the tank has a fluid capacity of about 100 gallons to about 2000 gallons.

8. A frame for an emergency vehicle, comprising:
  a pair of longitudinally extending side rails;
  a plurality of lateral supports extending transversely between the pair of longitudinally extending side rails to form a ladder shaped configuration, wherein an envelope of space is defined between the pair of longitudinally extending side rails and between an adjacent pair of the plurality of lateral supports;
  a tank mounted within the envelope of space, the tank configured carry a flame retardant fluid; and
  wherein the tank includes integral side rail portions, the integral side rail portions extending through the tank such that the tank surrounds the integral side rail portions, the integral side rail portions configured for mechanical attachment to the pair of longitudinally extending side rails.

9. The frame of claim 8, wherein the integral side rail portions form load bearing members of the frame.

10. A frame for an emergency vehicle, comprising:
  a pair of longitudinally extending side rails;
  a plurality of lateral supports extending transversely between the pair of longitudinally extending side rails to form a ladder shaped configuration;
  a tank configured to carry a flame retardant fluid mounted directly to and extending between the pair of longitudinally extending side rails, the tank including a port for fluid communication with an interior of the tank;
  a pumping system mounted to the pair of longitudinally extending side rails and connected to the port of the tank for pumping flame retardant fluid into and out of the tank; and wherein the tank has a T-shaped cross section, with a first portion having a first width less than a second width of a second portion.

11. The frame of claim 10, wherein the pumping system includes a motor in fluid communication with the port of the tank for providing a pumping force to pump the flame retardant fluid into and out of the tank, the motor interposed between the pair of longitudinally extending side rails.

12. The frame of claim 11, wherein the pumping system includes a pump housing in fluid communication with the motor and with the port of the tank, the pump housing configured to divert fluid pumped from the tank to a conduit connected to the pump housing, and configured to divert fluid into the tank.

13. The frame of claim 12, wherein the pumping system includes a plurality of ports for selectively diverting fluid from the tank, and wherein at least one port is configured for connection with a secondary tank.

14. The frame of claim 10, wherein the second portion is mounted on top of a top surface of the pair of longitudinally extending side rails.

15. The frame of claim 10, wherein each one of the pair of longitudinally extending side rails has a C-shaped profile that defines an interior channel, wherein the second portion of the tank extends into the interior channel of each of the longitudinally extending side rails.

16. A frame for an emergency vehicle, comprising:
a pair of longitudinally extending side rails;
a plurality of lateral supports extending transversely between the pair of longitudinally extending side rails to form a ladder shaped configuration;
a tank configured to carry a flame retardant fluid mounted directly to and extending between the pair of longitudinally extending side rails, the tank including a port for fluid communication with an interior of the tank;
a pumping system mounted to the pair of longitudinally extending side rails and connected to the port of the tank for pumping flame retardant fluid into and out of the tank; and
wherein each of the pair of longitudinally extending side rails includes a top surface, the top surface of one of the pair of longitudinally extending side rails coplanar with the top surface of the other one of the pair of longitudinally extending side rails, and wherein each of the pair of longitudinally extending side rails includes a bottom surface, the bottom surface of one of the pair of longitudinally extending side rails coplanar with the bottom surface of the other one of the pair of longitudinally extending side rails, and wherein the tank is mounted to the pair of longitudinally extending side rails such that it does not extend above the top surfaces of the pair of longitudinally extending side rails, and such that it does not extend below the bottom surfaces of the pair of longitudinally extending side rails.

* * * * *